(12) United States Patent
Maeda et al.

(10) Patent No.: US 10,069,374 B2
(45) Date of Patent: Sep. 4, 2018

(54) ROTARY ELECTRIC MACHINE HAVING AN HEAT SINK WITH SEMICONDUCTOR MODULES ATTACHED

(75) Inventors: Naohide Maeda, Chiyoda-ku (JP); Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 80 days.

(21) Appl. No.: 14/115,718

(22) PCT Filed: Oct. 25, 2011

(86) PCT No.: PCT/JP2011/074499
§ 371 (c)(1),
(2), (4) Date: Nov. 5, 2013

(87) PCT Pub. No.: WO2013/061404
PCT Pub. Date: May 2, 2013

(65) Prior Publication Data
US 2014/0070645 A1    Mar. 13, 2014

(51) Int. Cl.
*H02K 5/18*    (2006.01)
*H02K 9/02*    (2006.01)
(Continued)

(52) U.S. Cl.
CPC ............... *H02K 5/18* (2013.01); *H02K 9/02* (2013.01); *H02K 9/04* (2013.01); *H02K 9/06* (2013.01);
(Continued)

(58) Field of Classification Search
CPC .... H02K 5/18; H02K 11/0073; H02K 11/042; H02K 11/046; H02K 11/04; H02K 19/36;
(Continued)

(56) References Cited

U.S. PATENT DOCUMENTS 3,792,338 A    2/1974   Barthelemy
4,321,664 A *  3/1982   Matthai ............... H01L 23/467
                                            257/E23.099
(Continued)

FOREIGN PATENT DOCUMENTS

EP    1460749 A1    9/2004
EP    1993192 A1    11/2008
(Continued)

OTHER PUBLICATIONS

Yamasaki Masashi; Furumoto Atsushi; Kabune Hideki, Drive Device, Dec. 29, 2010, Denso Corporation, WO2010150529.*
(Continued)

*Primary Examiner* — Bernard Rojas
*Assistant Examiner* — Alexander Singh
(74) *Attorney, Agent, or Firm* — Sughrue Mion, PLLC; Richard C. Turner (57) ABSTRACT

A rotary electric machine in accordance with the invention includes: a case including a front-side housing and a rear-side housing; a rotor having a field winding placed in the case; a stator having an armature winding placed in the case; a power module for energizing armature current that flows in the armature winding; a heat sink, on which the power module is mounted, for cooling the power module; a field circuit module for controlling field current that flows in the field winding; and a control circuit for controlling the operation of the power module and the field circuit module, wherein the power module includes a pair of power modules mounted opposite to each other on a base surface of the heat sink, and the heat sink includes a plurality of cooling fins placed thereon.

5 Claims, 11 Drawing Sheets

(51) Int. Cl.
*H02K 9/04* (2006.01)
*H02K 9/06* (2006.01)
*H02K 19/36* (2006.01)
*H02K 11/04* (2016.01)

(52) U.S. Cl.
CPC ......... *H02K 11/048* (2013.01); *H02K 19/365* (2013.01)

(58) Field of Classification Search
CPC .... H02K 19/06; H02K 19/365; H02K 11/048; H02K 9/00; H02K 9/04; H02K 9/06; H02K 9/12; H02K 5/20; H02K 11/05
USPC ...... 310/68 D, 68 R, 67 R, 71, 52, 64, 60 R, 310/58
See application file for complete search history.

(56) References Cited

U.S. PATENT DOCUMENTS

| | | | | |
|---|---|---|---|---|
| 5,821,674 | A * | 10/1998 | Weiner | H01L 25/115 257/E25.026 |
| 7,196,441 | B2 * | 3/2007 | Ueda | H01L 23/36 257/E23.101 |
| 2004/0183385 | A1 | 9/2004 | Takahashi et al. | |
| 2007/0035270 | A1* | 2/2007 | Kitamura | H02K 9/06 318/727 |
| 2007/0188119 | A1* | 8/2007 | Sonoda | H02K 11/048 318/400.21 |
| 2008/0197727 | A1 | 8/2008 | Dubuc et al. | |
| 2009/0243407 | A1 | 10/2009 | Kato et al. | |
| 2011/0018374 | A1 | 1/2011 | Yamasaki et al. | |
| 2011/0175496 | A1 | 7/2011 | Shirakata et al. | |
| 2011/0193432 | A1 | 8/2011 | Takechi et al. | |
| 2011/0286185 | A1* | 11/2011 | Abe | H05K 7/209 361/710 |
| 2012/0098361 | A1 | 4/2012 | Yamasaki et al. | |
| 2012/0098365 | A1 | 4/2012 | Yamasaki et al. | |
| 2012/0098366 | A1 | 4/2012 | Yamasaki et al. | |
| 2012/0098391 | A1 | 4/2012 | Yamasaki et al. | |
| 2012/0181903 | A1 | 7/2012 | Kato et al. | |

FOREIGN PATENT DOCUMENTS

| | | | | |
|---|---|---|---|---|
| JP | 2004-282905 | A | 10/2004 | |
| JP | 2004282905 | A | 10/2004 | |
| JP | 2005-86149 | A | 3/2005 | |
| JP | 200586149 | A | 3/2005 | |
| JP | 2007-336638 | A | 12/2007 | |
| JP | 2007336638 | A | 12/2007 | |
| JP | 2008-543263 | A | 11/2008 | |
| JP | WO 2010150529 | A1 * | 12/2010 | .......... B62D 5/0406 |
| JP | 2011-30405 | A | 2/2011 | |
| JP | 2011-147319 | A | 7/2011 | |
| JP | 2011-166948 | A | 8/2011 | |
| JP | 2011166948 | A | 8/2011 | |

OTHER PUBLICATIONS

Communication dated Aug. 10, 2015 from the European Patent Office in counterpart application No. 11874579.3.
Communication dated Jun. 26, 2015 from the State Intellectual Property Office from the People's Republic of China in counterpart application No. 201180071713.1.
Communication dated Sep. 2, 2014 from the Japanese Patent Office in counterpart Japanese Patent Application No. 2013540530.
Communication dated Dec. 22, 2016 from the European Patent Office in counterpart European application No. 11874579.3.

* cited by examiner

ROTARY ELECTRIC MACHINE HAVING AN HEAT SINK WITH SEMICONDUCTOR MODULES ATTACHED

CROSS REFERENCE TO RELATED APPLICATIONS

This application is a National Stage of International Application No. PCT/JP2011/074499, filed on Oct. 25, 2011, the contents of all of which are incorporated herein by reference in their entirety.

TECHNICAL FIELD

The present invention relates to a structure of a rotary electric machine connected to an engine.

BACKGROUND ART

It is proposed that a heat sink is mounted on a conventional rotary electric machine, the heat sink including: a fin protruding from one base surface of the heat sink; and a module fixed to the opposite base surface, the module having a switching device for controlling armature current (for example, see PTL 1 and PTL 2).

Furthermore, PTL 3 proposes a drive apparatus integrated into a motor, the apparatus having a heat sink to which semiconductor modules are attached, each of the modules including a switching device for one phase.

CITATION LIST

Patent Literature

PTL 1: JP-A-2011-147319
PTL 2: JP-T-2008-543263
PTL 3: JP-A-2011-30405

SUMMARY OF INVENTION

Technical Problem

It is proposed that in the above-described conventional rotary electric machine described in the PTL 1, when a power circuit module and a field circuit module that include a switching device are mounted on a heat receiving part of a heat sink, the surface on the heat sink side of the modules are machined into a convex shape in order to maintain constant the distance between the modules and the heat receiving part.

It is proposed that in the rotary electric machine described in the PTL 2, a heat sink has a top surface on which an electronic component is mounted and a back surface on which a fin is configured, then the fin is placed between a rear housing of the rotary electric machine and the electronic component, and then the electronic component is cooled by air taken in in the radial direction.

As described in the PTL 1 and PTL 2, the module is cooled by cooling air flow taken in in the radial direction. However, these rotary electric machines use a fan attached to a rotor the rotary electric machine as a generator of the cooling air flow, the cooling air flow being discharged in a direction from the rotation shaft to the periphery of the rotor. A stator is placed along the periphery of the rotor. So, the cooling air discharged from the fan of the rotor cools the coil of the stator, then is discharged to the outside of the rotary electric machine in the radial direction, thereby being heated to high temperature. As described above, in the PTL 1 and PTL 2, since air is taken in in the radial direction, the heated air discharged from the rotary electric machine in the radial direction may be taken in again, which raises a problem of insufficient cooling capability.

Furthermore, since air is taker in in the radial direction and discharged in the radial direction, the direction of the cooling air flow needs to be changed by about 180 degree, which raises a problem of large resistance leading to insufficient amount of the cooling air flow.

Furthermore, in the PTL 1, a power module for a stator for six-phases and a field module are placed on a base surface of a planar heat sink. However, since the modules are placed almost throughout the base surface, placing a component in the remaining space in the same shaft direction is difficult because it may elongate the length in the shaft direction of the overall rotary electric machine or need too large size to contain within the periphery of the stator of the rotary electric machine, so mounting to an engine may be impossible.

Regarding the drive apparatus described in the PTL 3, in order to reduce the size of the drive apparatus and improve the heat dissipation capability of semiconductor modules in using the drive apparatus as a power-assistance apparatus for vehicle, it is proposed that the semiconductor modules are placed on the heat sink in a vertical direction to reduce the size and the heat received from an adjacent semiconductor module.

The PTL 3 proposes a motor for a power-assistance apparatus for vehicle. Since, this type of motor assists in torque when a driver steers, the rotor of the motor rotates only at low speed. So, cooling effect is not expected from attaching a fan to the rotor.

Accordingly, this motor is configured such that a fan for generating cooling air flow and a fin of the heat sink is not provided, and a semiconductor module is fixed to the heat sink having a large heat capacity, then cooling is performed mainly by transferring heat from the heat sink to a housing. So the cooling capability provided by the structure of the PTL 3 may be insufficient for a rotary electric machine that always operates to drive power generation.

In order to solve the above problem, it is an object of the present invention to provide a rotary electric machine that can have sufficient cooling capability.

Solution to Problem

A rotary electric machine in accordance with the invention includes: a case including a front-side housing and a rear-side housing; a rotor having a field winding placed in the case; a stator having an armature winding placed in the case; a power module for energizing armature current that flows in the armature winding; a heat sink, on which the power module is mounted, for cooling the power module; a field circuit module for controlling field current that flows in the field winding; and a control circuit for controlling the operation of the power module and the field circuit module, wherein the power module includes a pair of power modules mounted opposite to each other on a base surface of the heat sink, and the heat sink includes a plurality of cooling fins placed thereon.

Furthermore, a rotary electric machine in accordance with the invention includes: a case including a front-side housing and a rear-side housing; a rotor having a field winding placed in the case; a stator having an armature winding placed in the case; a power module for energizing armature current that flows in the armature winding; a heat sink, on which the power module is mounted, for cooling the power module; a field circuit module for controlling field current that flows in the field winding; and a control circuit for controlling the operation of the power module and the field circuit module, wherein the power module includes a pair of power modules, the heat sink includes a pair of heat sinks, one of the pair of power modules is mounted on one base surface of the heat sink, the other of the pair of power modules is mounted on the other base surface of the heat sink, the heat sink includes a plurality of cooling fins placed thereon, and the respective base surfaces of the heat sinks are joined to each other to configure a heat sink assembly.

Advantageous Effects of Invention

According to the rotary electric machine in accordance with the invention, the power module includes a pair of power modules mounted opposite to each other on a base surface of the heat sink, and the heat sink includes a plurality of cooling fins placed thereon, which enhances the cooling capability of the rotary electric machine.

Furthermore, according to the rotary electric machine in accordance with the invention, the power module includes a pair of power modules; the heat sink includes a pair of heat sinks; one of the pair of power modules is mounted on one base surface of the heat sink; the other of the pair of power modules is mounted on the other base surface of the heat sink; the heat sink includes a plurality of cooling fins placed thereon; and the respective base surfaces of the heat sinks are joined to each other to configure a heat sink assembly, which can enhance the cooling capability of the rotary electric machine. Furthermore, each power module is fixed to one side of the base surface of the heat sink, which can facilitate the fabrication to reduce the manufacturing cost.

DESCRIPTION OF EMBODIMENTS

First Embodiment

Figure 1:
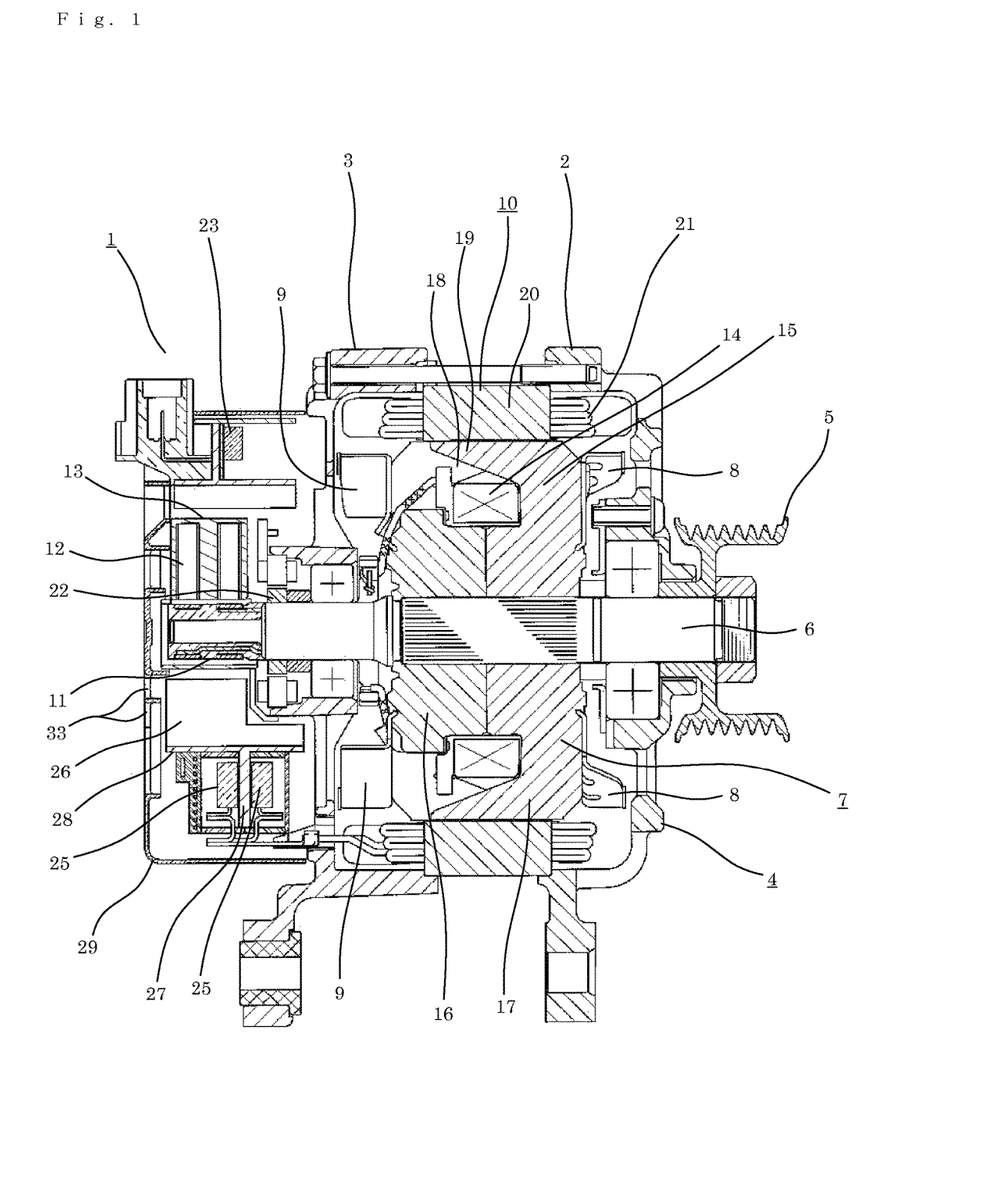
FIG. 1 is a cross-sectional view showing a rotary electric machine in accordance with a first embodiment of the invention.
Figure 2:
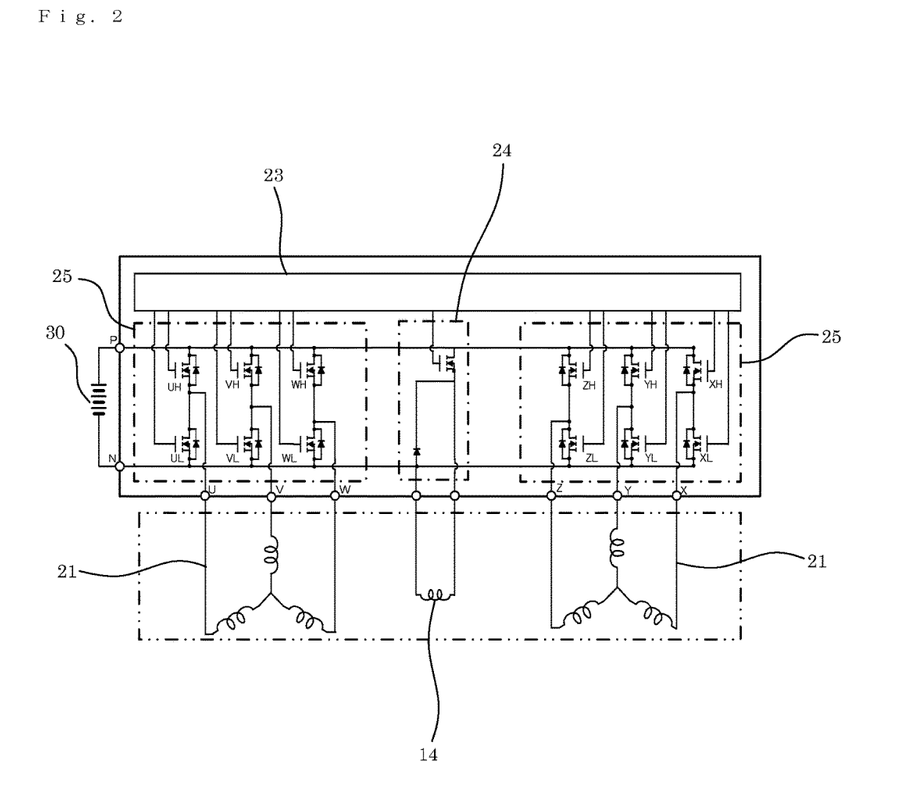
FIG. 2 is an electric circuit diagram showing the rotary electric machine in accordance with the first embodiment of the invention.
Figure 3:
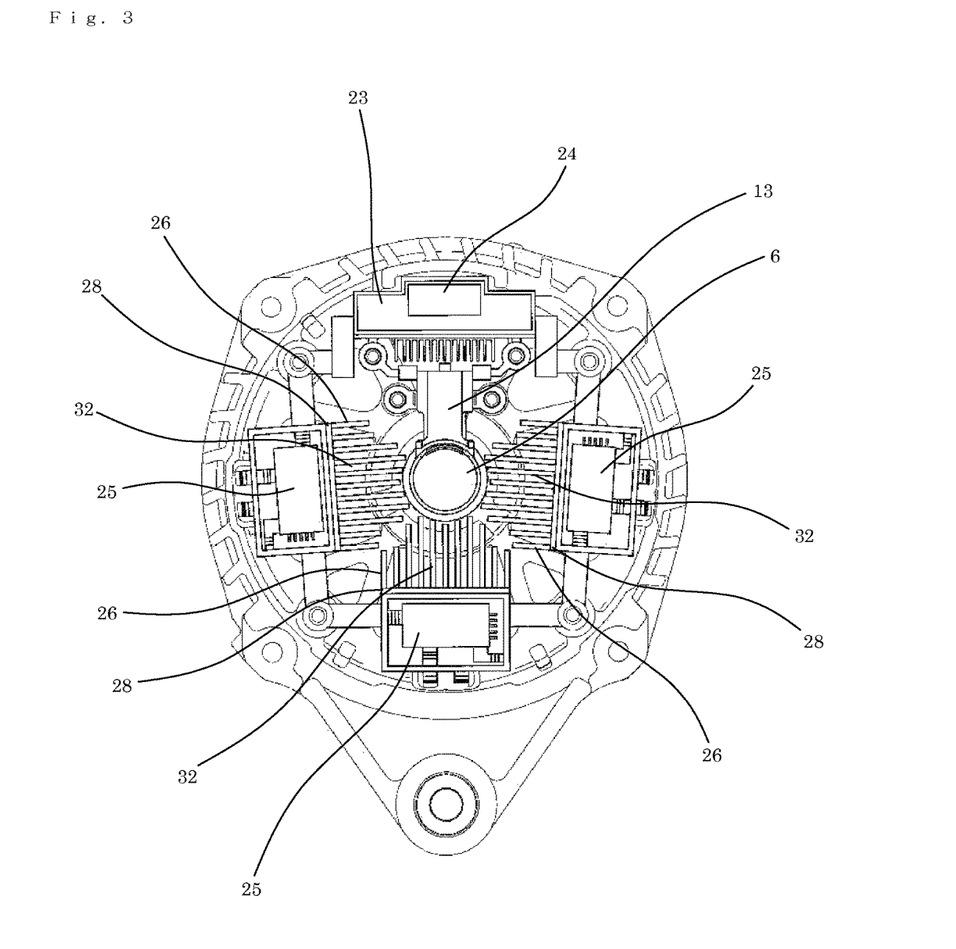
FIG. 3 is a plan view showing a heat sink assembly mounted on the rotary electric machine in accordance with the first embodiment of the invention.
Figure 4:
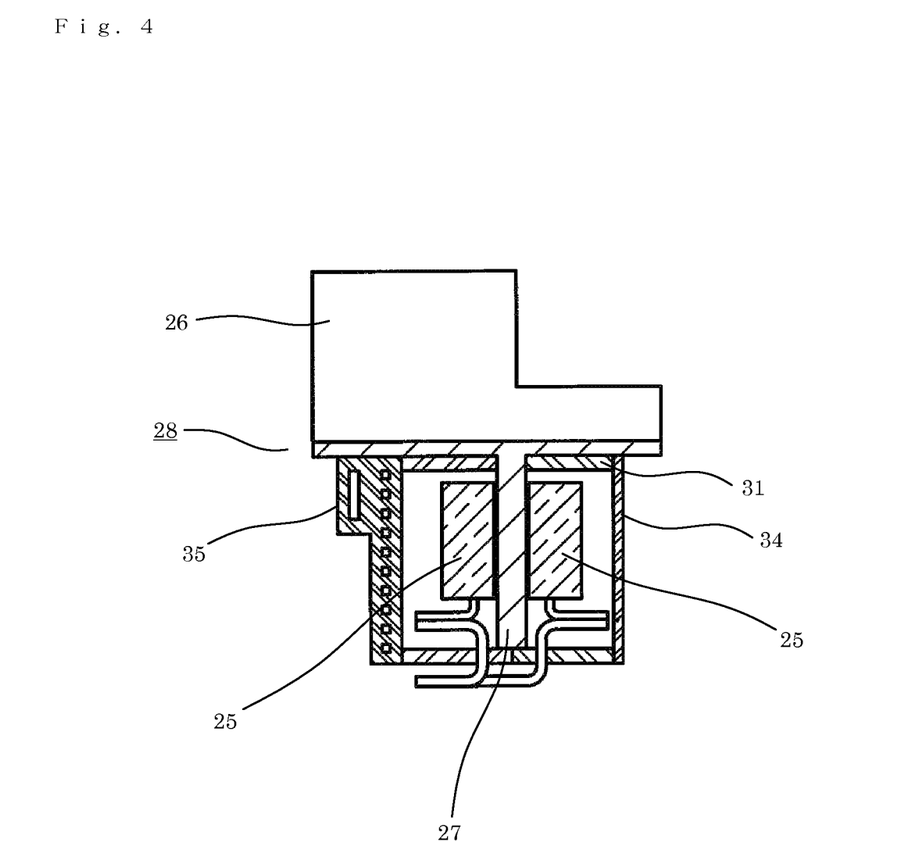
FIG. 4 is a cross-sectional view showing the heat sink assembly in the rotary electric machine in accordance with the first embodiment of the invention.

A first embodiment of the invention is described below with reference to FIGS. 1 to 4. Through the drawings, the same or corresponding members or portions are denoted by the same numerals. FIG. 1 is a cross-sectional view showing a rotary electric machine in accordance with the first embodiment of the invention. FIG. 2 is an electric circuit diagram showing the rotary electric machine in accordance with the first embodiment of the invention. FIG. 3 is a plan view showing a heat sink assembly mounted on the rotary electric machine in accordance with the first embodiment of the invention. FIG. 4 is a cross-sectional view showing the heat sink assembly in the rotary electric machine in accordance with the first embodiment of the invention.

In the following embodiment, a rotary electric machine is described as an example. When used as a motor, the rotary electric machine can restart an engine connected thereto. When used as a generator, the rotary electric machine can supply power to a vehicle and charge a battery.

Referring to FIG. 1, a rotary electric machine 1 of the first embodiment includes, for example: a case 4 including a front-side housing 2 and a rear-side housing 3 that are made of aluminum; a shaft 6 that is provided in the case 4 and has a pulley 5 attached to one end thereof; a rotor 7 mounted on the shaft 6; a front fan 8 (e.g., a centrifugal fan) for generating cooling air flow, mounted on the rotor 7 on the front-side housing 2 side; a rear fan 9 (e.g., a centrifugal fan) for generating cooling air flow, mounted on the rotor 7 on the rear-side housing 3 side; a stator 10 fixed to the front-side housing 2 and the rear-side housing 3 on the inner wall surface of the case 4; a slip ring 11 fixed to the other end of the shaft 6 for supplying field current to the rotor 7; a pair of brushes 12 that slide over the slip ring 11; and a brush holder 13 that is fixed to the rear-side housing 3 and contains the brushes 12.

Note that the pulley 5 is connected to an internal combustion engine (not shown) by a belt for transferring power to/from the internal combustion engine. Furthermore, field current is supplied to the rotor 7 through the brushes 12 from the brush holder 13 that has the slip ring 11 and is fixed to the rear-side housing 3 side.

The rotor 7 includes: a field winding 14 that is formed by winding a wire and generates magnetic flux when current flows therein; and a field core 15 that is provided to cover the field winding 14 and has a magnetic pole formed by the magnetic flux.

The field core 15 includes a pair of a first pole core body 16 and a second pole core body 17 that are fit to each other. The first pole core body 16 and the second pole core body 17 are made of iron and have nail-shaped magnetic poles 18 and 19, respectively. The nail-shaped magnetic poles 18 and 19 adjacent to each other are placed to form a certain width of inter-magnetic pole gap so that magnetic flux leakage will not occur between the nail-shaped magnetic poles and the inter-magnetic pole gap will work as a cooling air flow passage for cooling the field winding 14.

The stator 10 includes: a stator core 20; and an armature winding 21 in which a wire is wound around the slot (not shown) of the stator core 20 and, when the rotor 7 rotates, alternating current is generated in response to change in the magnetic flux of the field winding 14. For example, the armature winding 21 includes a three-phase AC winding in which three windings (not shown) are connected in three-phase Y connection or three-phase Δ connection.

The front-side housing 2 and the rear-side housing 3 are coupled to each other with a fastening bolt to sandwich the stator core 20 between the front-side housing 2 and the rear-side housing 3.

A rotation sensor 22 is attached to the shaft 6 on the brush holder 13 side. The rotary electric machine 1 includes a control circuit 23 for controlling a field circuit and a switching circuit, for example, on the periphery of the brush holder 13. A field circuit module 24 for causing field current to flow according to an instruction from the control circuit 23 is provided. The field current is adjusted by the field circuit so that a required torque or power can be generated. The field circuit is packaged into the field circuit module 24 that is mounted on the rotary electric machine 1.

A switching device for supplying armature current in working as a motor and rectifying armature current in working as a generator is provided as a power module 25 into which the switching device for one phase and a peripheral circuit are integrated. Then, the power modules 25 for three phases are placed so as to be separated from one another, as shown in FIG. 3. The power module 25 is mounted on a heat sink 26 for cooling and fixed to the rear-side housing 3.

The power module 25 is fixed by bonding or the like to a predetermined place on a base surface 27 of the heat sink 26 for cooling. The power modules 25 are placed so as to sandwich the base surface 27 of the heat sink 26 therebetween to configure one heat sink assembly 28.

In order to protect the power module 25, the field circuit module 24, the control circuit 23 and the like, a cover 29 for covering them is mounted on the rear side of the rotary electric machine 1. Note that a battery 30 is shown in FIG. 2.

An operation of the rotary electric machine in accordance with the first embodiment of the invention is described. When the rotary electric machine 1 operates as a motor, the control circuit 23 instructs the field circuit module 24 to cause field current to flow and then the field winding 14 is energized. Next, three-phase AC current wave shape is caused to flow in the power module 25 to rotate the rotor 7, thereby generating a torque.

On the other hand, when the rotary electric machine 1 operates as a generator, the control circuit 23 receives an request for a current to be generated, from an external controller, and instructs the field circuit of the field circuit module 24 to cause field current to flow according to the requested current to be generated.

Furthermore, the control circuit 23 measures phase voltage and, when the phase voltage exceeds output voltage, instructs the power module 25 to switch the switching device, thereby rectifying AC current generated in the armature winding 21 into DC current.

FIG. 4 is a cross-sectional view of the heat sink assembly 28 of the first embodiment of the invention. In the first embodiment of the invention, the stator 10 has a plurality of sets of three-phase armature windings 21, and includes the power module 25 for each phase.

The power module 25 is fixed by bonding or the like to the predetermined place on the base surface 27 of the heat sink 26 for cooling. The power modules 25 are placed so as to sandwich the base surface 27 of the heat sink 26 therebetween to configure one heat sink assembly 28.

The heat sink assembly 28 is mounted on the rotary electric machine 1 such that the base surface 27 of the heat sink 26 on which the power module 25 is mounted is perpendicular to the shaft 6 of the rotary electric machine 1. A case 31 into which a wiring to the power module 25 and the like are inserted is placed around the base surface 27 of the heat sink 26, and a terminal of the power module 25 is connected to the case 31.

The heat sink 26 includes a fin 32 protruding from the base surface 27 inwardly in the radial direction of the rotary electric machine 1. The cover 29 shown in FIG. 1 includes an air intake port 33 formed so that air can be taken in from the rotation shaft direction to the fin 32.

Furthermore, the cover 29 includes a side wall from the rear-side end face of the rotary electric machine 1 to the rear-side housing 3 to prevent air intake from the radial direction. Furthermore, an opening of the case 31 opposite the base surface 27 of the heat sink 26 is covered by a protection cover 34 for protecting the power module 25. As shown in FIG. 4, a protection cover 35 of an opening on the rear side may include a signal line and an output wiring for connecting to the control circuit 23.

An effect of this embodiment is described. Two power modules 25 are placed so as to sandwich the base surface 27 of the heat sink 26 therebetween, which can reduce the footprint of the power modules 25 in the radial cross section in the rotary electric machine 1, thereby reducing the size of the rotary electric machine 1 and enhancing the cooling capability by placing the fin 32 of the heat sink 26 in the remaining space.

Furthermore, the fin 32 is protruded inwardly in the radial direction, which can ensure a sufficient length of the fin 32 to enhance the cooling capability. Furthermore, cooling air flow is taken in from the shaft direction and taking in air from the radial direction is prevented, which enables effective cooling.

As described above, according to the first embodiment, the power modules 25 are placed so as to sandwich the base surface 27 of the heat sink 26 therebetween, which can reduce the footprint of the power modules 25 in the radial cross section in the rotary electric machine 1 and correspondingly allows reservation of a larger area for the fin 32 of the heat sink 26, thereby enhancing the cooling capability. Furthermore, the fin 32 of the heat sink 26 is configured to be cooled by cooling air flow that is parallel to the rotation shaft 6, which prevents the intake of air discharged from the radial direction of the rotary electric machine 1 and reduces the resistance when cooling air flow passes, thereby enhancing the cooling capability of the rotary electric machine 1.

Furthermore, the fin 32 of the heat sink 26 is configured to protrude in the radial direction, which allows reservation of a larger area for the fin 32 of the heat sink 26. Furthermore, since the rear-side fan 9 of the rotor 7 takes in air from the rotation shaft direction and discharges air toward the periphery, the fin 32 is protruded toward the inner radius, which causes cooling air flow to efficiently flow along the fin 32, resulting in further enhancement of the cooling capability of the rotary electric machine 1.

Second Embodiment

Figure 5:
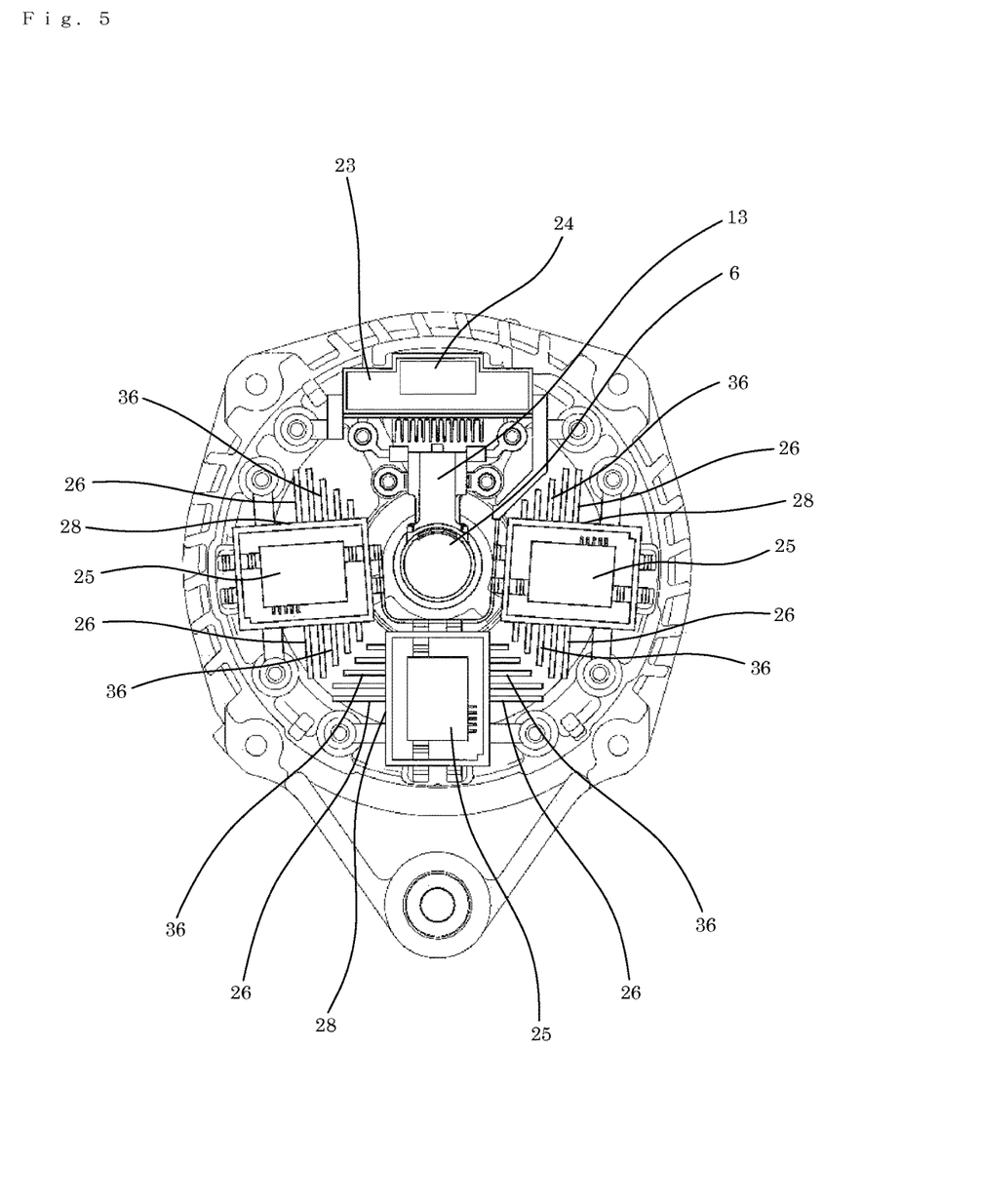
FIG. 5 is a plan view showing a heat sink assembly mounted on a rotary electric machine in accordance with a second embodiment of the invention.

A second embodiment of the invention is described with reference to FIG. 5. FIG. 5 is a plan view showing a heat sink assembly mounted on a rotary electric machine in accordance with a second embodiment of the invention.

Generally, the structure and operation of the second embodiment are the same as those of the above-described first embodiment. Similarly to the above-described first embodiment, in the second embodiment, two power modules 25 are mounted so as to sandwich a base surface 27 of a heat sink 26 therebetween, and a fin 36 is protruded from the base surface 27 of the heat sink 26 generally in the circumferential direction when mounted on the rotary electric machine 1. A case 31 into which a wiring to the power module 25 and the like are inserted is placed around the base surface 27 of the heat sink 26, and a terminal of the power module 25 is connected to the case 31.

The power module 25 needs to be connected to an armature winding 21. So, in order to facilitate connection between them, the power module 25 and the armature winding 21 are placed adjacent to each other in the circumferential direction. As shown in the second embodiment, the power modules 25 is placed so as to sandwich the base surface 27 of the heat sink 26 therebetween, which facilitates reservation of a space in the circumferential direction for the fin 36 and can efficiently place the fin 36 so as to enhance the cooling effect.

On the other hand, a signal wiring, an output wiring and the like can be placed on the inner- and outer-circumference side, which facilitates effective space utilization to reduce the size of the rotary electric machine.

According to the second embodiment, the heat sink 26 is placed so that, when mounted on the rotary electric machine 1, the fin 36 protrudes from the base surface 27 of the heat sink 26 in the circumferential direction. Especially, in the rotary electric machine having a plurality of three-phase winding as described in the PTL 1, the power modules are placed throughout the surface in the radial direction, which makes it difficult to take in cooling air flow from the shaft direction. However, placing the power modules 25 so as to sandwich the base surface 27 of the heat sink 26 therebetween as shown in the second embodiment can reduce the space on which the power modules 25 are placed. Correspondingly, the fin 36 can be placed so as to protrude in the circumferential direction, allowing cooling air flow to be taken in from the shaft direction, which can take in cooler air and reduce the resistance of the air flow passage, thereby more efficiently cooling the power modules 25.

Third Embodiment

Figure 6:
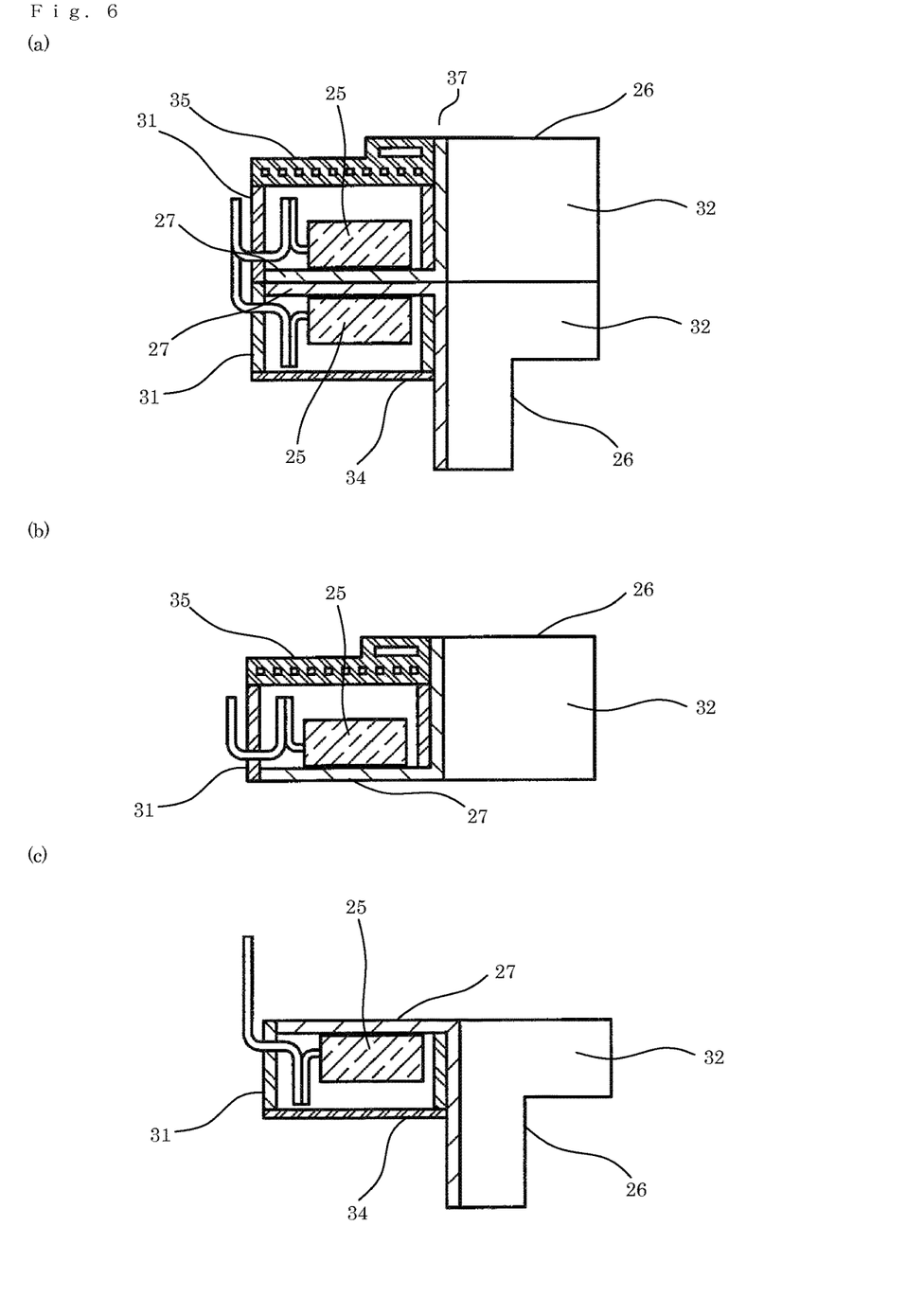
FIG. 6 is an axial cross-sectional view showing a heat sink assembly in a rotary electric machine in accordance with a third embodiment of the invention.
Figure 7:
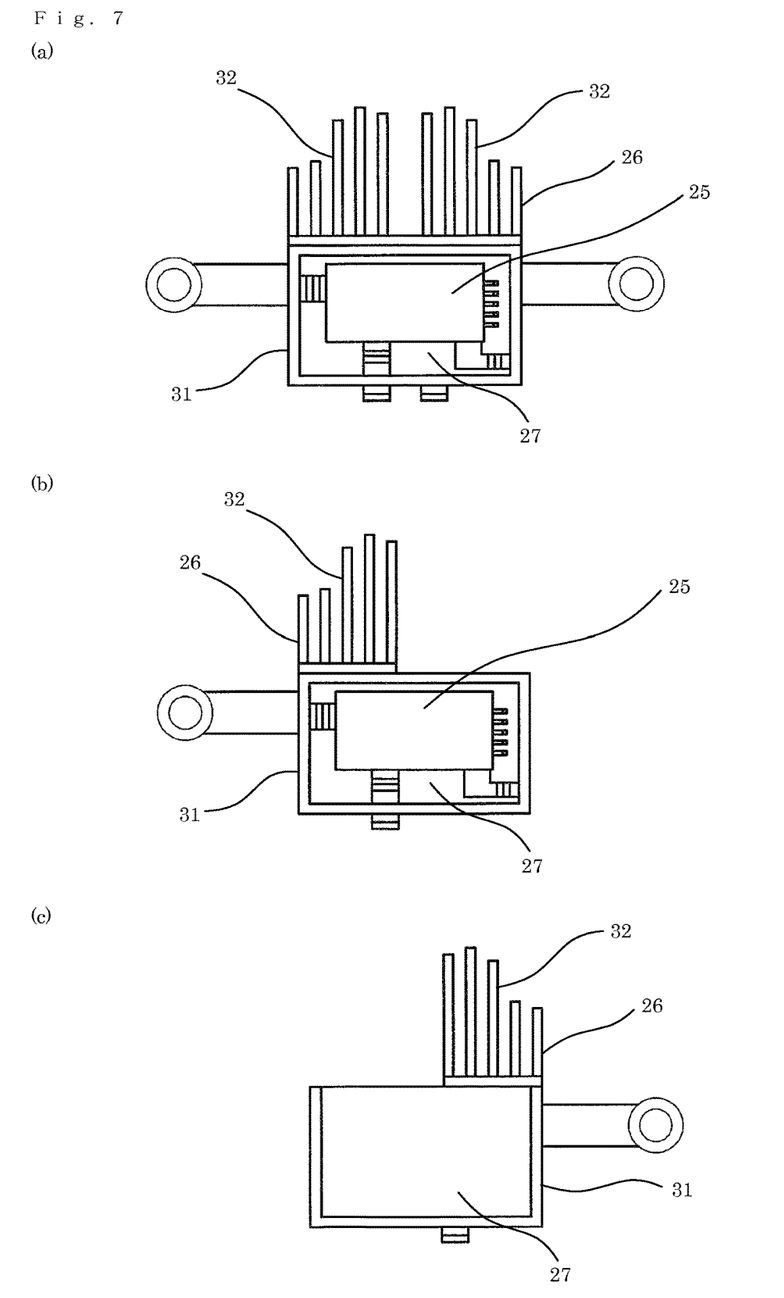
FIG. 7 is an axial cross-sectional view showing the heat sink assembly in the rotary electric machine in accordance with the third embodiment of the invention.

A third embodiment of the invention is described with reference to FIGS. 6 and 7. Through the drawings, the same or corresponding members or portions are denoted by the same numerals. FIG. 6 is an axial cross-sectional view showing a heat sink assembly in a rotary electric machine in accordance with the third embodiment of the invention. FIG. 7 is an axial cross-sectional view showing the heat sink assembly in the rotary electric machine in accordance with the third embodiment of the invention.

A heat sink assembly 37 of the third embodiment includes: a power module 25 mounted on a base surface 27 of a heat sink 26; and a case 31, into which a wiring to the power module 25 and the like are inserted, placed around the base surface 27 and connected with a terminal of the power module 25. Specifically, the heat sink assembly 37 is divided into: a portion as shown in FIG. 6(b) in which one power module 25 is mounted on a base surface 27 of one heat sink 26 and then a case 31 and a protection cover 35 are provided; and a portion as shown in FIG. 6(c) in which one power module 25 is mounted on a base surface 27 of one heat sink 26 and then a case 31 and a protection cover 34 are provided, and then these portions are integrated into the heat sink assembly 37 as shown in FIG. 6(a).

Next, the base surfaces 27 of the two heat sinks 26 on which the power modules 25 are not mounted are joined and fixed to each other. Fixing the heat sinks 26 to each other can be performed by applying an adhesive or the like between the base surfaces 27 or applying a heat-conductive grease or the like between the base surfaces 27 and mechanically fixing the heat sinks 26 with additional parts using a screw or the like.

The third embodiment is configured so that a fin 32 protrudes from the base surface 27 of the heat sink 26 toward the inner radius in the rotary electric machine 1. Such a configuration of the heat sink assembly 37 can reduce the footprint of the power module 25 in the radial cross section in the rotary electric machine 1, thereby reducing the size of the rotary electric machine 1 and enhancing the cooling capability by placing the fin 32 of the heat sink 26 in the remaining space.

Furthermore, the fin 32 is protruded inwardly in the radial direction, which can ensure a sufficient length of the fin 32 to enhance the cooling capability. Furthermore, cooling air flow is taken in from the shaft direction and taking in air from the radial direction is prevented, which enables effective cooling. Furthermore, regarding the power modules 25 mounted on the heat sink 26, since one power module 25 is mounted on only one side of the base surface 27 of the heat sink 26, the step of fixing the power modules 25 to the heat sink 26 is more simple than the step of placing the power modules 25 on both sides of the base surface 27.

In FIG. 6, the fins 32 of the heat sinks 26 combined in the heat sink assembly 37 are divided in the shaft direction, and the areas of the fins 32 are configured to be almost the same. This allows the cooling capability of the heat sink 26 placed on the one side to conform to that on the other side. It should be appreciated that when there is a difference in the cooling capability between the heat sinks 26 in mounting the rotary electric machine 1 on an engine the division position may be changed to eliminate the difference.

Furthermore, although the fins 32 are L-shaped in the shaft direction in FIG. 6, if the fins 32 are rectangular, the fins 32 can be divided at the center, in which both the heat sinks 26 can be the same and then the cost can be reduced.

FIG. 7 is a side view of the heat sink assembly 37 showing another example of the shape of the fin 32 of the heat sink assembly 37 of the third embodiment of the invention. In the heat sink assembly 37 in FIG. 7, the fins 32 of the heat sink 26 are divided into left and right, side, then the divided fins 32 are combined into the heat sink assembly 37. In this configuration, the two heat sinks 26 are cooled in the same way from the upstream to the downstream of cooling air flow, so the two heat sinks 26 can be cooled uniformly.

Specifically, the heat sink assembly 37 is divided into: a portion as shown in FIG. 7(b) in which one power module 25 is mounted on a base surface 27 of one heat sink 26 and then a case 31 and a fin 32 are provided; and a portion as shown in FIG. 7(c) in which one power module 25 is mounted on a base surface 27 of one heat sink 26 and then a case 31 and a fin 32 are provided, and then these portions are integrated into the heat sink assembly 37 as shown in FIG. 7(a).

According to the third embodiment, the power module 25 including a switching device for energizing armature current is fixed to the base surface 27 of the heat sink 26, then the base surfaces 27 of the heat sinks 26 are stacked with the power modules 25 aligned with each other and fixed into the heat sink assembly 37, and then a plurality of the heat sink assemblies 37 are mounted on the rotary electric machine 1, which can provide an effect similar to that of the above-described first embodiment. Furthermore, the power module 25 is fixed to one side of the base surface 27 of the heat sink 26, which can facilitate the fabrication to reduce the manufacturing cost.

Furthermore, similarly to the above-described first embodiment, the third embodiment is configured so that the fin 32 of the heat sink 26 protrudes in the radial direction, which allows reservation of a larger area for the fin 32 of the heat sink 26. Furthermore, since the rear-side fan 9 of the rotor 7 takes in air from the rotation shaft direction and discharges air toward the periphery, the fin 32 is protruded toward the inner radius, which causes cooling air flow to efficiently flow along the fin, resulting in enhancement of the cooling capability of the rotary electric machine.

Fourth Embodiment

Figure 8:
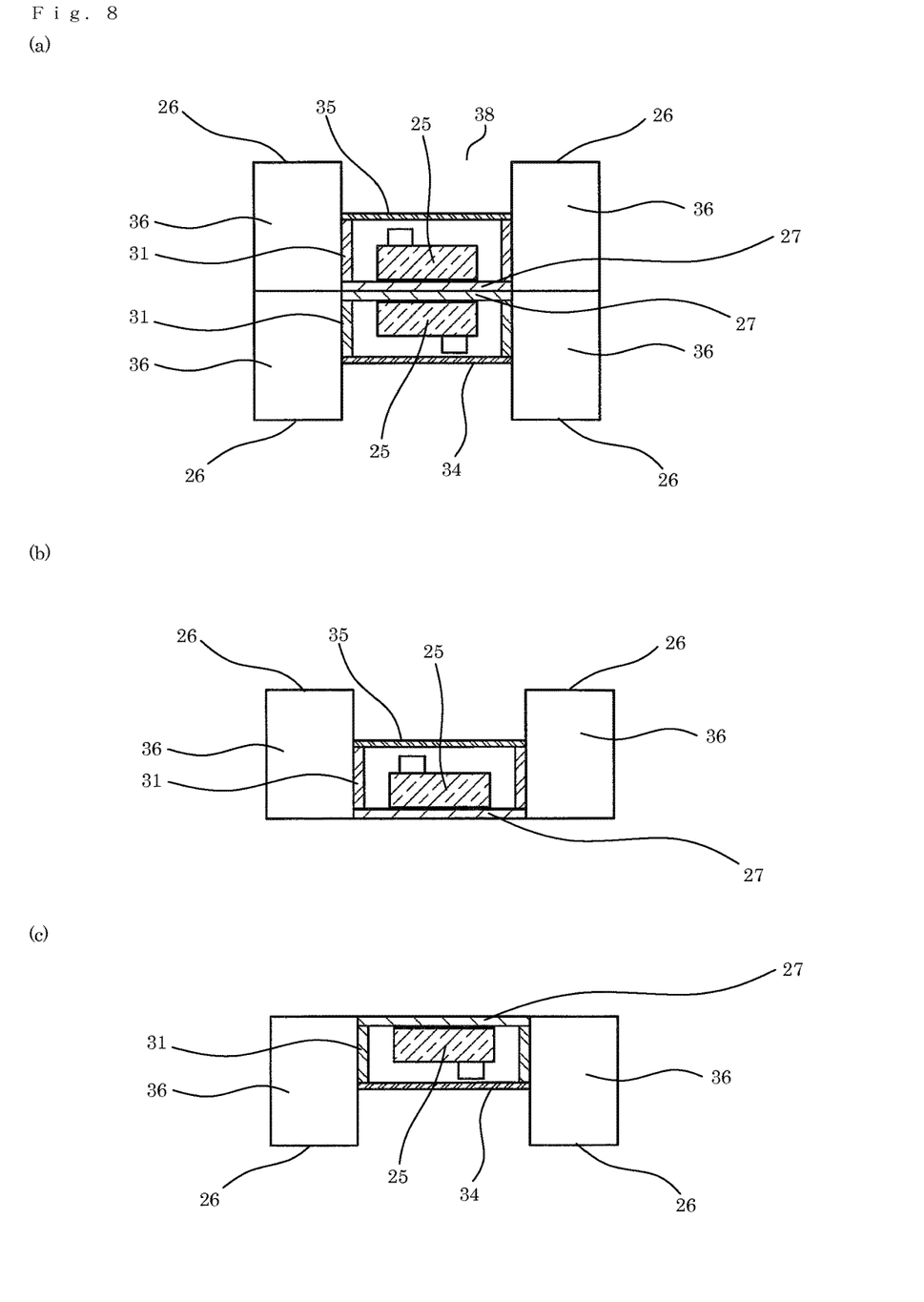
FIG. 8 is an axial cross-sectional view showing a heat sink assembly in a rotary electric machine in accordance with a fourth embodiment of the invention.
Figure 9:
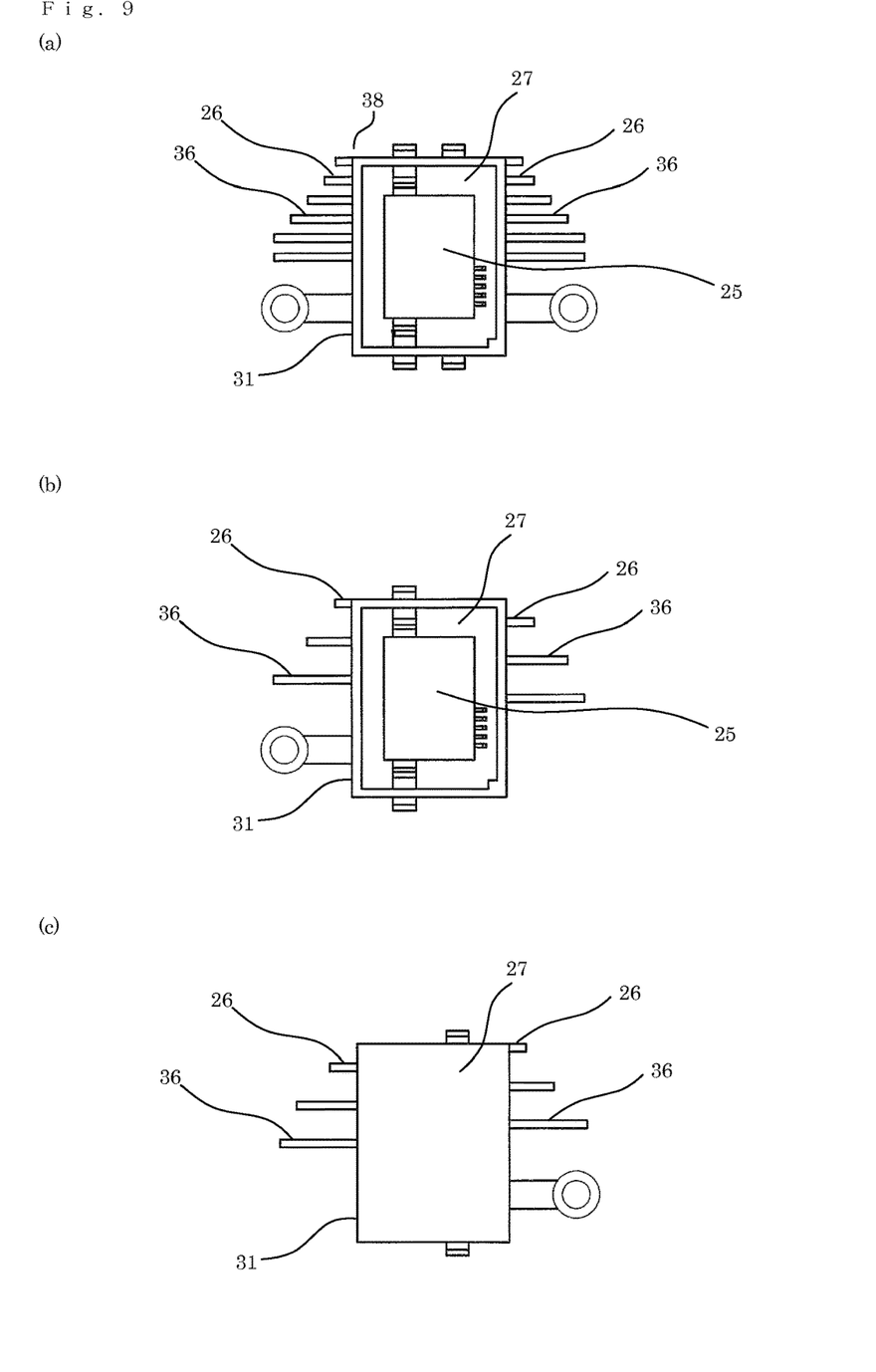
FIG. 9 is an axial cross-sectional view showing the heat sink assembly in the rotary electric machine in accordance with the fourth embodiment of the invention.
Figure 10:
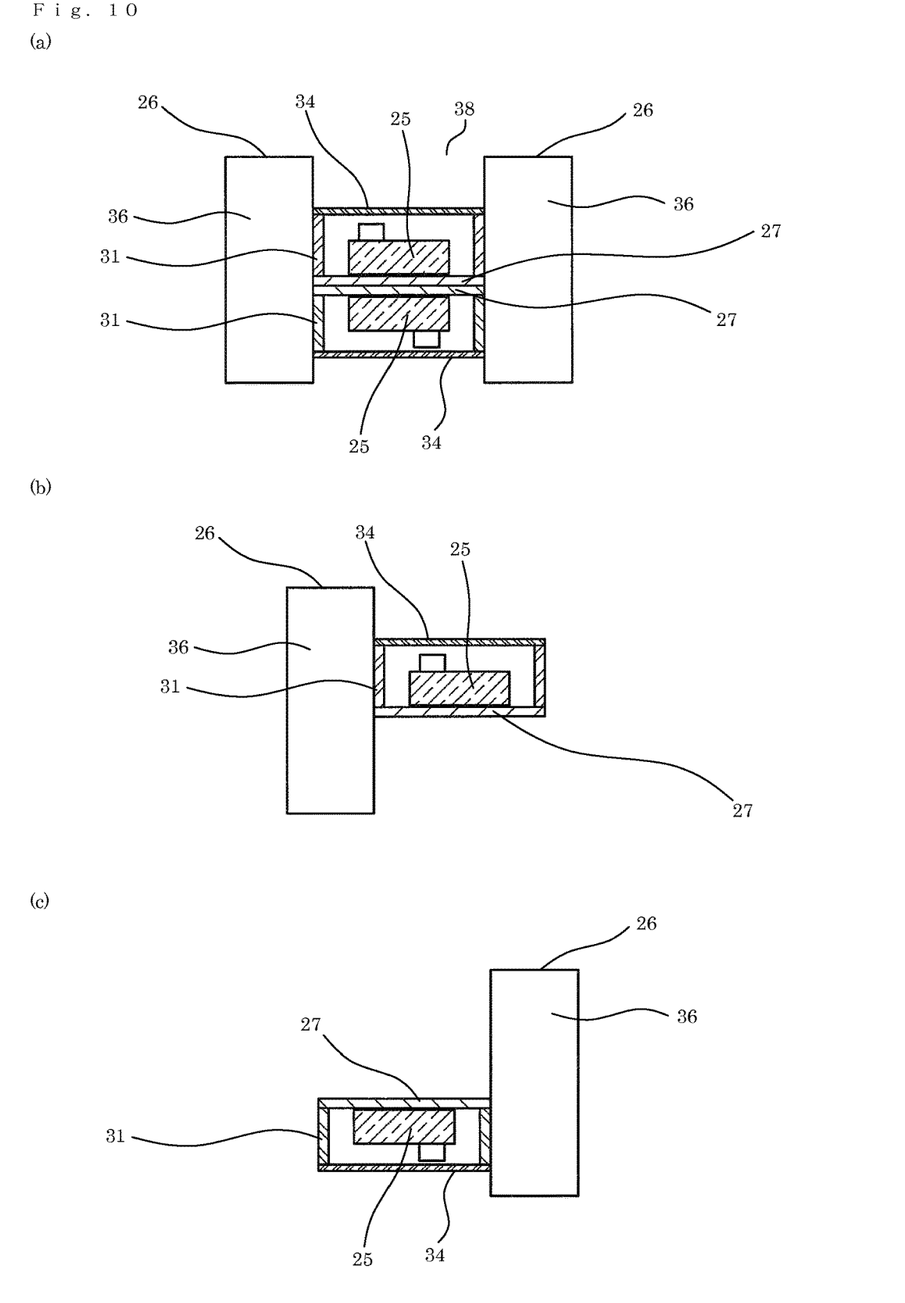
FIG. 10 is an axial cross-sectional view showing the heat sink assembly in the rotary electric machine in accordance with the fourth embodiment of the invention.

A fourth embodiment of the invention is described with reference to FIGS. 8 to 10. Through the drawings, the same or corresponding members or portions are denoted by the same numerals. FIG. 8 is an axial cross-sectional view showing a heat sink assembly in a rotary electric machine in accordance with the fourth embodiment of the invention. FIG. 9 is an axial cross-sectional view showing the heat sink assembly in the rotary electric machine in accordance with the fourth embodiment of the invention. FIG. 10 is an axial cross-sectional view showing the heat sink assembly in the rotary electric machine in accordance with the fourth embodiment of the invention.

Similarly to the above-described third embodiment, a heat sink assembly 38 of the fourth embodiment is configured by mounting a power module 25 on a base surface 27 of a heat sink 26, then joining and fixing to each other the base surfaces 27 of the two heat sinks 26 on which the power modules 25 are not mounted. A fin 36 protruding from the base surface 27 of the heat sink 26 is configured to protrude in the circumferential direction of the rotary electric machine 1.

The heat sink assembly 38 shown in FIG. 8 is configured in shape such that the fin 36 of the heat sink 26 is divided at almost the middle of the length in the shaft direction and the divided portions are combined. Accordingly, the same heat sink 26 can be used irrespective of position in the shaft direction when combined, which can reduce the cost. When there is a difference in the cooling capability of the heat sink 26 depending on the position in the shaft direction, the division position can be changed so that the cooling capability will be uniform.

Specifically, the heat sink assembly 38 is divided into: a portion as shown in FIG. 8(b) in which one power module 25 is mounted on a base surface 27 of one heat sink 26 and then a case 31, a protection cover 34 and the fin 36 are provided; and a portion as shown in FIG. 8(c) in which one power module 25 is mounted on a base surface 27 of one heat sink 26 and then a case 31, a protection cover 34 and the fin 36 are provided, and then these portions are integrated into the heat sink assembly 38 as shown in FIG. 8(a).

FIG. 9 is a side view of the heat sink assembly 38 showing another example of the shape of the fin 36 of the heat sink assembly 38 of the fourth embodiment of the invention. As shown in FIG. 9, when the two heat sinks 26 are combined, the fins of the heat sinks 26 are arranged in a staggered configuration. In this configuration, the two heat sinks 26 are cooled in the same way from the upstream to the downstream of cooling air flow, so the two heat sinks 26 can be cooled uniformly.

Specifically, the heat sink assembly 38 is divided into: a portion as shown in FIG. 9(b) in which one power module 25 is mounted on a base surface 27 of one heat sink 26 and then a case 31 and a fin 36 are provided; and a portion as shown in FIG. 9(c) in which one power module 25 is mounted on a base surface 27 of one heat sink 26 and then a case 31 and a fin 36 are provided, and then these portions are integrated into the heat sink assembly 37 as shown in FIG. 9(a).

FIG. 10 is a cross-sectional view of the heat sink assembly 38 showing another example of the shape of the fin 36 of the heat sink assembly 38 of the fourth embodiment of the invention. As shown in FIG. 10, the fins 36 protruding in two circumferential directions of the heat sink assembly 38 are configured such that one fin 36 of one circumferential direction is configured on one heat sink 26, then the combined heat sink assembly 38 configures the fins of two directions. The fin 36 of the heat sink 26 for one direction can enhance the manufacturability of the heat sink 26.

Specifically, the heat sink assembly 38 is divided into a portion as shown in FIG. 10(b) in which one power module 25 is mounted on a base surface 27 of one heat sink 26 and then a case 31, a protection cover 34 and the fin 36 for one direction are provided; and a portion as shown in FIG. 10(c) in which one power module 25 is mounted on a base surface 27 of one heat sink 26 and then a case 31, a protection cover 34 and the fin 36 for the other direction are provided, and then these portions are integrated into the heat sink assembly 38 as shown in FIG. 10(a).

Similarly to the above-described second embodiment, the fourth embodiment is configured so that the fin 36 of the heat sink 26 protrudes in the circumferential direction, which allows reservation of a larger area for the fin 36 of the heat sink 26. Furthermore, since the rear fan 9 of the rotor 7 takes in air from the rotation shaft direction and discharges air toward the periphery, the fin 36 is protruded toward the inner radius, which causes cooling air flow to efficiently flow along the fin, resulting in enhancement of the cooling capability of the rotary electric machine. Furthermore, similarly to the above-described third embodiment, the fabrication can be facilitated to reduce the manufacturing cost.

Fifth Embodiment

Figure 11:
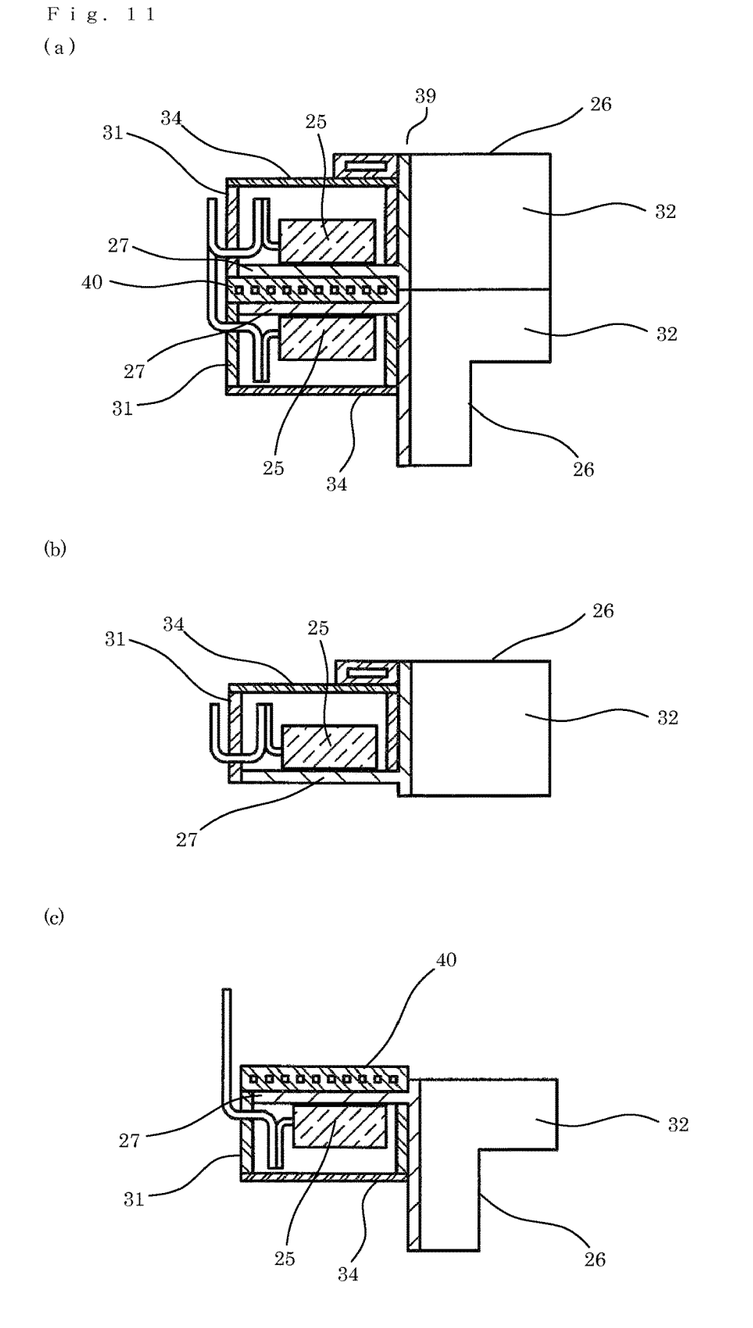
FIG. 11 is a cross-sectional view showing a heat sink assembly in a rotary electric machine in accordance with a fifth embodiment of the invention.

A fifth embodiment of the invention is described with reference to FIG. 11 FIG. 11 is a cross-sectional view showing a heat sink assembly in a rotary electric machine in accordance with the fifth embodiment of the invention.

A power module 25 is fixed to a base surface 27 of a heat sink 26. A case 31, into which a wiring to the power module 25 and the like are inserted, is placed around the power module 25 on the base surface 27. A terminal of the power module 25 is connected to the case 31. Thus, a heat sink assembly 39 includes the heat sink 26, the power module 25, the case 31, a fin 32 and a protection cover 34. Note that in the fifth embodiment, the fin 32 provided on the heat sink 26 protrudes inwardly in the radial direction. Furthermore, a signal member 40 for communicating signal of the power modules 25 and a control circuit 23 is placed between the base surfaces 27 of the heat sinks 26.

Specifically, the heat sink assembly 39 is divided into: a portion as shown in FIG. 11(b) in which one power module 25 is mounted on a base surface 27 of one heat sink 26 and then a case 31, a protection cover 34 and the fin 32 are provided; and a portion as shown in FIG. 11(c) in which one power module 25 is mounted on a base surface 27 of one heat sink 26 and then a case 31, a protection cover 34 and the fin 32 are provided, and then with the signal member 40 sandwiched between the base surfaces 27 of the heat sinks 26 of the both portions these portions are integrated into the heat sink assembly 39 as shown in FIG. 11(a).

Next, the signal member 40 for communicating signal of the power modules 25 and the control circuit 23 is placed so as to be sandwiched between the base surfaces 27 of the heat sink 26 of the heat sink assembly 39 such that the signal member 40 is aligned with the two power modules 25 in the radial direction, then this combination is arranged in the circumferential direction.

According to the fifth embodiment, after the power module 25 is mounted on the heat sink 26, when the two heat sinks 26 are joined to each other such that the power modules 25 are aligned with each other, the signal member 40 including a signal line for controlling the power modules 25 is placed between the base surfaces 27 of the heat sinks 26, which allows the signal line to be protected. Furthermore, the mountability on the rotary electric machine 1 can be enhanced.

The heat sink assembly 39 configured as described above is mounted on a housing of the rotary electric machine 1. In addition to the heat sink assembly 39, a field circuit module 24 or the control circuit 23 may be fixed to the heat sink 26.

Furthermore, a member including a ground wiring for connecting to the power modules 25 and the like may be configured in a rear-side housing 3, and a member including an output wiring may be configured in the rear-side end face of the rotary electric machine 1 or a cover 29.

A power assembly configured as described above can be manufactured and tested in a separate process, then a plurality of completed power assemblies are mounted on a rotary electric machine at one time, which facilitates the fabrication.

Note that the embodiments of the invention may be freely combined or appropriately modified or omitted within the scope of the invention.

INDUSTRIAL APPLICABILITY

The invention is suitable for providing a rotary electric machine that can have sufficient cooling capability.

The invention claimed is:

1. A rotary electric machine comprising: a case including a front-side housing and a rear-side housing; a rotor having a field winding placed in the case; a stator having an armature winding placed in the case; a power module for energizing armature current that flows in the armature winding; a field circuit module for controlling field current that flows in the field winding; and a control circuit for controlling the operation of the power module and the field circuit module, wherein
 a pair of divided heat sinks, each having a base part that is parallel to an axial direction of the rotor, each having a base surface that extends orthogonally from the base part to an outside of the rotor and on which the power module is mounted, and each having a plurality of fins for cooling the power module that is placed on a side opposite to the base surface of the base part, is provided,
 an integrated heat sink assembly is configured by joining the base surface of one of the heat sinks and the base surface of the other of the heat sinks, and
 the power module is placed in a pair opposite to each other on the base surface of one of the heat sinks and the base surface of the other of the heat sinks.

2. The rotary electric machine according to claim 1, wherein the heat sink comprises a fin that, when the heat sink is fixed to a rotary electric machine, protrudes in the radial direction of the rotary electric machine with respect to a part to which the power module is fixed.

3. The rotary electric machine according to claim 1, wherein each of the pair of divided heat sinks comprises a plurality of fins that, when the heat sink assembly is fixed to a rotary electric machine, protrude on both sides of the circumferential direction with respect to a part to which the power module is fixed.

4. The rotary electric machine according to claim 3, wherein each of the heat sinks comprises a plurality of fins that, when the heat sink assembly is fixed to a rotary electric machine, protrudes on a first side and a second side of the circumferential direction, respectively, with respect to a part to which the power module is fixed.

5. The rotary electric machine according to claim 1, wherein a signal member including a signal wiring to the power module is placed so as to be sandwiched between the base surfaces of the heat sinks.

* * * * *